United States Patent [19]

Sinutko, Jr.

[11] Patent Number: 5,101,374
[45] Date of Patent: Mar. 31, 1992

[54] SECURE, FAST STORAGE AND RETRIEVAL WITHOUT INTERACTIVE CHECKING

[75] Inventor: Michael Sinutko, Jr., Glen Burnie, Md.

[73] Assignee: The United States of America as represented by the Director of the National Security Agency, Washington, D.C.

[21] Appl. No.: 196,402

[22] Filed: May 19, 1988

[51] Int. Cl.$^5$ .................................... G06F 12/14
[52] U.S. Cl. .............................. 395/725; 364/963; 364/963.2; 364/966.1; 364/966.4; 364/969; 364/969.4; 364/DIG. 2
[58] Field of Search ... 364/200 MS File, 900 MS File

[56] References Cited

U.S. PATENT DOCUMENTS

| | | | |
|---|---|---|---|
| 4,300,192 | 11/1981 | Coleur et al. | 395/425 |
| 4,306,284 | 12/1981 | Lumley | 364/148 |
| 4,321,667 | 3/1982 | Robbins et al. | 395/575 |
| 4,521,853 | 6/1985 | Guttag | 395/425 |
| 4,590,552 | 5/1986 | Guttag et al. | 395/425 |
| 4,713,753 | 2/1987 | Boebert et al. | 364/200 |

OTHER PUBLICATIONS

Department of Defence Trusted Computer System Evaluation Criteria, Dec. 1985.
Sinutko, M. "Memory Access to Multiple-Sensitivity Information", *Proceedings of the Seventeenth International Symposium on Multiple-Valued Logic*, May 26–28, 1987, pp. 109+.
Sinutko, Michael, "Definitive and Assertive Access to Multilevel Information", Proceedings of the Third Annual Symposium on Physical/Electronic Security, Philadelphia Chapter, Armed Forces Communications and Electronics Association, Aug., 1987, pp. 1-1 thru 1-8.
Sinutko, Michael, "Secure, Fast Storage and Retrieval without Interactive Checking", *Proceedings, 1988 Carnahan Conference on Security Technology: Electronic Crime Countermeasures*, University of Kentucky, Lexington, Ky., May 10–12, 1988, pp. 1–5.

*Primary Examiner*—Gareth D. Shaw
*Assistant Examiner*—John Loomis
*Attorney, Agent, or Firm*—John R. Utermohle; Thomas O. Maser

[57] ABSTRACT

A method and apparatus for secure, fast storage and retrieval of information relative to a storage device without interactive checking is characterized by the use of a unique variable range adder. The variable range adder automatically modifies addresses to the storage device and causes data storage and retrieval to conform to the Bell and LaPadula security model, independently of software.

10 Claims, 4 Drawing Sheets

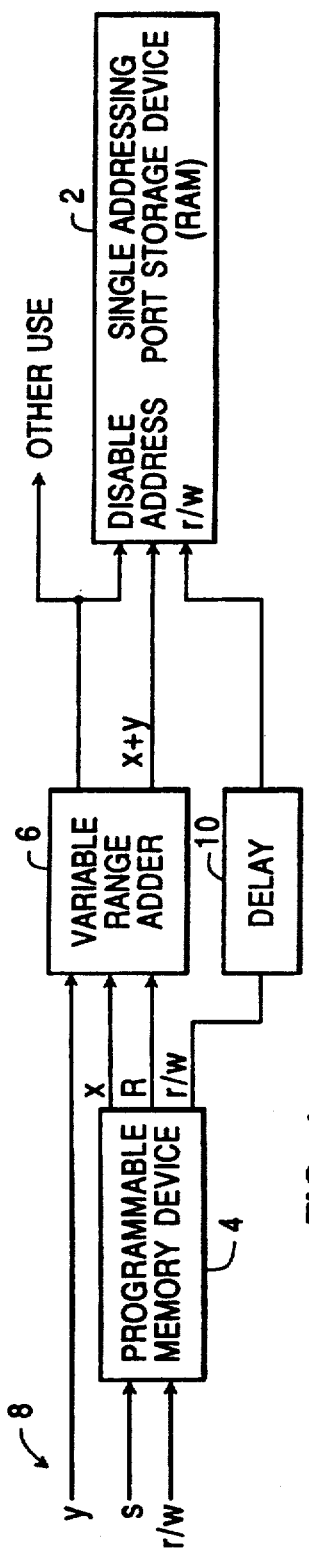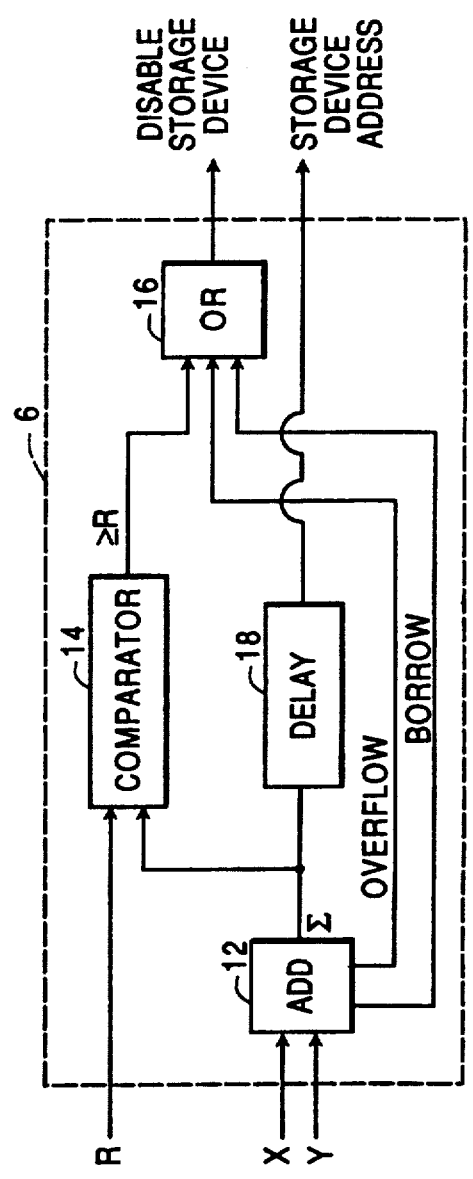

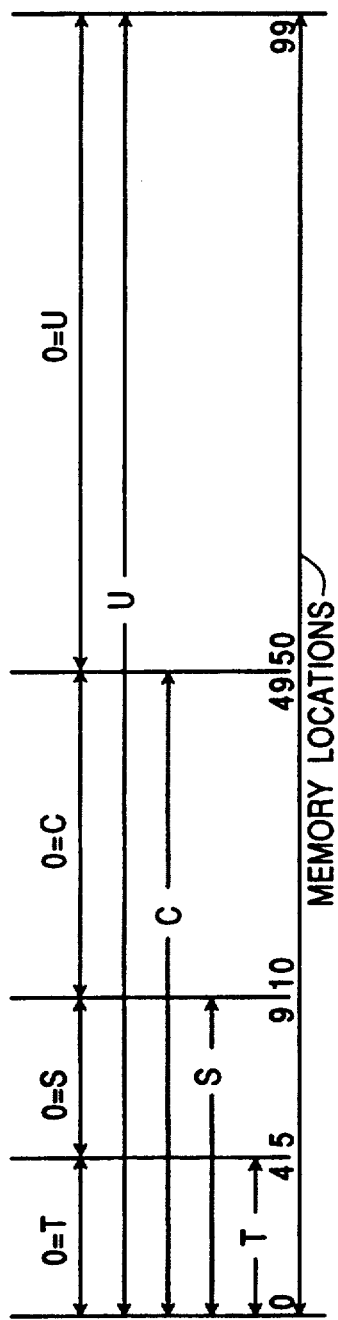

SECURE, FAST STORAGE AND RETRIEVAL WITHOUT INTERACTIVE CHECKING

BACKGROUND OF THE INVENTION

The present invention relates to a method and apparatus for secure, fast storage and retrieval of data from a storage device (such as a random access memory) without interactive checking. Information storage and retrieval is in accordance with the Bell and LaPadula (BL) security model, and no interaction with software nor information sensitivity labelling is necessary.

The Bell and LaPadula model defines a subject as an attempting accessor and an object as that to which access is sought. Given a subject's access privilege s and an object's access requirement o, where s and o are members of the same ordered set of sensitivities, the BL model asserts that:

(1) a subject may read an object only where $s \geq o$;
(2) a subject may write an object only when $o \geq s$; and
(3) a subject may neither read nor write an object when s and o are incomparable.

This last condition is impossible when the set of sensitivities is totally ordered. The BL model is a defacto standard general mathematical model of a secure computer, where secure means acceptably prevented from revealing unauthorized information.

The invention uses a combinatorial electronic device, referred to as a variable range adder (VRA), to automatically modify storage addresses and, thereby, enforce the BL model security standard for write and read access.

BRIEF DESCRIPTION OF THE PRIOR ART

Secure memory devices are well-known in the patented prior art as evidenced by the U.S. Pat. Nos. 4,521,852, 4,521,853 to Guttag, and Guttag et al U.S. Pat. No. 4,590,552. The '853 patent, for example, discloses a microprocessor/microcomputer with a secured memory device comprising an electrically programmable memory, a random access memory (RAM), a central processing unit, and an information transfer bus. A security bit is provided to indicate the status of data stored in the nonvolatile memory and in portions of the RAM, and an address logic is used to determine the security status of the information stored in both memories.

While the prior devices operate satisfactorily, they process certain inherent drawbacks which are overcome by the present invention. For example, none of the prior devices implements a security model, and none is able to yield secure storage and retrieval without tagged security bits or some other record kept of where certain sensitivity information has been stored.

The present invention overcomes these and other drawbacks of the prior devices by providing a secure, fast storage and retrieval method and apparatus. These present mathematically determined, overlapping sections of storage to its users that depend upon a user's access privilege if retrieve (read) access is desired; and upon sensitivity of the information to be stored if store (write) access is desired. The method and apparatus of the invention apply where the access privileges and information sensitivities are mathematically members of the same totally-ordered set.

OBJECTS OF THE INVENTION

A primary object of the secure fast storage and retrieval method and VRA apparatus is to achieve hardware enforcement, for a storage device protected, of BL model storage and retrieval from which no process in the computer is excepted. The invention requires no sensitivity identifiers to be stored in addition to the information; no storage access requirement determination; no user access privilege comparisons with storage access requirement; and, therefore, no interaction between the computer's operating system and the method user. Since the invention requires no reading of storage location sensitivity, it is intrinsically more reliable (for totally-ordered sensitivities) than access filter methods, which require such information. A further object of the invention is to provide a VRA method and apparatus which stores information of equal or less than a specified sensitivity into segments physically-ordered by the sensitivity. Since each segment location is known, selected protection (e.g., EMI, RFI, radiation hardening, encryption, physical containment) may be afforded to the most sensitive. Such special treatment may be desirable anyway since information physically indexed by sensitivity can focus an adversary's efforts. Conversely, physical indexing by sensitivity can also focus an owner's emergency destruction efforts. Another byproduct and asset is that the method allows adjusting the storage amount per sensitivity, enabling a computer system administrator to optimally tune the allotments.

The VRA method and apparatus according to the invention also benefits multilevel-secure computer design in general: since they need no software to control secure information storage and retrieval, they eliminate, therefore, the need to verify such software for adherence to the BL model. Multilevel information, for which the multilevel security is desired, is defined here as information whose components are assigned different sensitivities from a totally-ordered set.

SUMMARY OF THE INVENTION

The apparatus for providing a subject with secure, fast storage and retrieval of data to or from a storage device includes an input device providing input signals: the subject's relative read or write address (y), the subject's access privilege (s), and a read or write signal (r/w) from the subject. A programmable memory device is connected with the input device for receiving the subject's access privilege signal (s) and the read or write signal (r/w). The programmable memory device converts the subject's access privilege signal into a biasing addend signal (x) and a maximum address parameter signal (R), appropriate to the subject's access privilege and read or write input. The programmable memory device also delivers the identical read or write input signal, possibly delayed, to the storage device. A variable range adder is connected with the input (y) and programmable device's biasing addend signal (x) and maximum address parameter signal (R). The variable range adder processes its received signals to address and disable the storage device in accordance with the sum of the read or write address signal (y) and the biasing addend signal (x), and in accordance with a comparison of that sum with the maximum address parameter signal (R).

The variable range adder includes an adding device for receiving and adding the read or write address signal (y) and the biasing addend signal (x) to produce a sum signal (Σ) for addressing the storage device. The adding device also produces first output signals when its adding ability is exceeded. The variable range adder also includes a comparator connected with the programmable memory device and with the adding device for comparing the maximum address parameter signal (R) and the sum signal (Σ) to produce a second output signal ($\geq R$) when the sum signal is greater than or equal to the maximum address parameter signal. An inclusive-OR logic device is connected with the adding device and the comparator for disabling the storage device in response to the first and second output signals, whereby reading and writing of the storage device is limited in response to inputs within a predetermined range.

In accordance with the inventive method for enabling writing and reading of a storage device, sets of contiguous write or read storage addresses are established with unique cardinalities among the read sets and write sets. The range of storage addresses available to a subject is equated to one of the write or read cardinalities of the storage device. The biasing addend value according to a subject's access privilege is then fixed to zero for writing; or R minus one of the read carbinalities, for reading. Next, presenting the subject's access privilege, a corresponding write or read signal, and an address signal cause writing the information presently on the storage device's data inputs, or reading to the data outputs information located at the address presently on the storage device's address inputs, respectively

BRIEF DESCRIPTION OF THE FIGURES

Other objects and advantages of the invention will become apparent from a study of the following specification when viewed in the light of the accompanying drawings, in which:

FIG. 1 is a block diagram of the secure, fast storage and retrieval apparatus according to the invention;

FIG. 2 is a block diagram illustrating the components of the variable range adder according to the invention;

FIG. 3 is an illustrative example of storage locations for "classifying" information within a memory and the resulting classification is of the objects o contained in its "real view" segments;

FIG. 4 is an illustration of the read, write, and real views for the example of FIG. 3;

DETAILED DESCRIPTION

The Apparatus of the Invention

Figure 5:
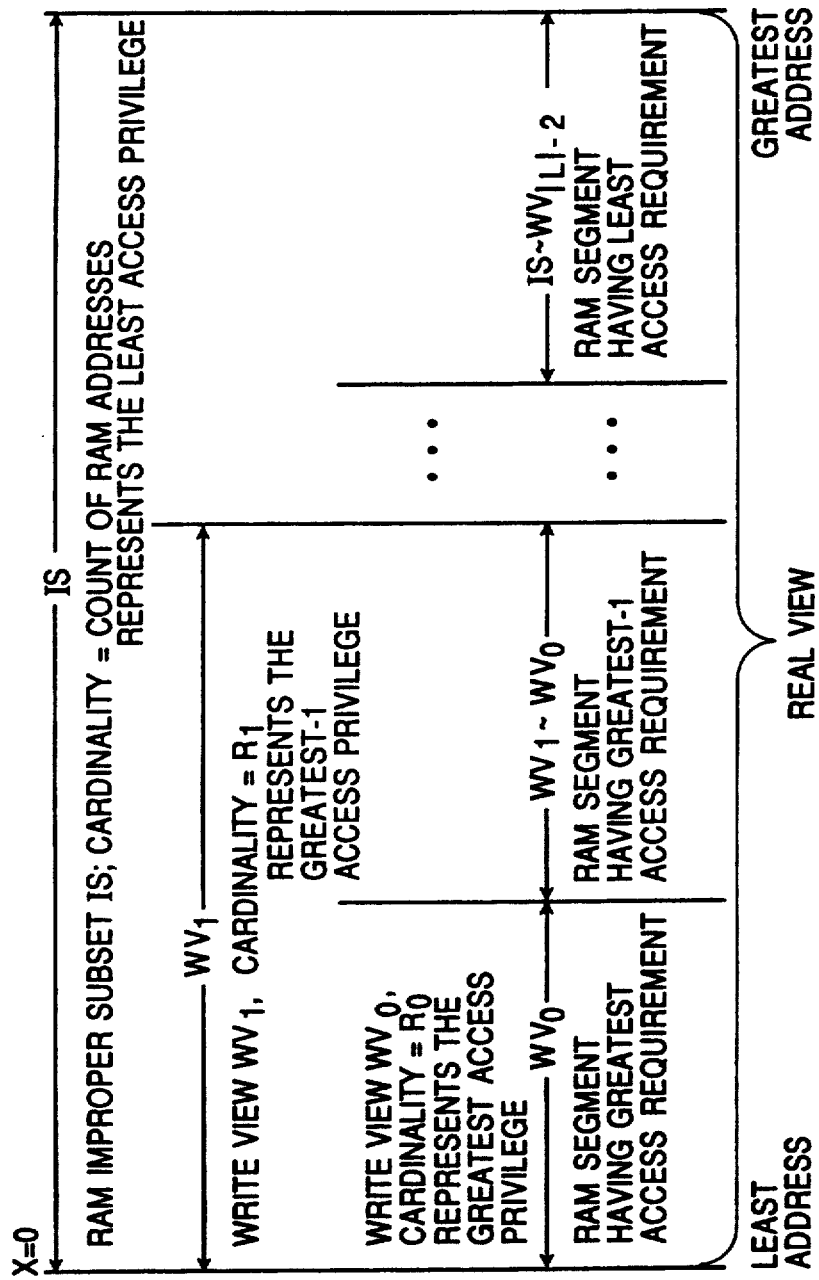
FIG. 5 illustrates the write and real views used to illustrate the method for secure, fast storage and retrieval according to the invention.

Referring first to FIG. 1, the secure, fast storage and retrieval apparatus according to the invention is shown. The apparatus is used in connection with a storage device 2, such as a random access memory (RAM), having a single addressing port. As developed in greater detail below, the apparatus includes a programmable memory device 4 and a variable range adder (VRA) 6 which process signals from a plurality of inputs 8 to write or read device 2, or neither, appropriate to the privilege presented by the accessor (i.e. subject).

The VRA effects Bell and LaPadula (BL) writing and reading by automatically adjusting the subject's write and read "views" of available storage. Subjects, including those from operating system processes, have no control over their access privileges and switching to the various views. Storage allocation, reading, and writing within a view, however, are left to software. Corrupted subjects and electronic malfunctions aside and within the abilities of the BL model, no operation within a view assigned some sensitivity $S_i$ can compromise $S_i$ information. Storage must be cleared, or contain no information whose sensitivity is in the totally-ordered set, before first applying the VRA-method of this invention.

A subject intending to write and having some access privilege $S_1$ (which the BL model assumes to be identical to the corresponding information) is given a physically different address range, within the "rear view" of storage, than a subject having some access privilege $S_2 \neq S_1$. The real view is the unedited view of storage dedicated to a given implementation of the VRA-method, having an address range over n contiguous real view segments. The least address of the real view is designated zero. The segments, each of which contains all the BL "objects" no greater than a unique sensitivity, correspond one-to-one with a total ordering of the n unique sensitivities of an implementation.

$S_1$ information, written to, for example, relative address 5 is stored at a physically different location than is $S_2$ information with relative address 5. Likewise, information having the same relative address is read from two physically different locations depending upon the reader's access privilege: $S_1$ or $S_2$. The VRA presents nothing to a subject that reveals the physical address used.

To write or read, a subject needs only to assert the (relative) object address and write or read signal. The object address may pass directly to the VRA or be modified by software. To gain immunity for the write and read mechanism from manipulation by software, all other VRA inputs must come only from the programmable memory device 4, such as a programmable read only memory (PROM), or any other device that yields certain previously entered information given the effective address of that information, which must be unalterable after system startup. A volatile memory may be substituted if quick destruction of all addressing clues to certain-sensitivity information is important.

As shown in FIG. 1, the input 8 provides two input signals to the programmable device. The first is a read or write signal r/w from the subject and the second is the subject's access privileges. This second input signal is from an inviolable source. The access privilege s is assumed by the BL model to be identical to the information sensitivity during writing. For writing, the programmable memory device 4 converts its inputs to $x = 0$ (representing the least physical storage address used) and the count of storage locations assigned to a given information sensitivity. For reading, the programmable device 4 converts its inputs to certain minimum physical storage addresses given reader access privilege, and the count of all storage locations dedicated to this writing and reading scheme. A storage location may be any resolution unit such as a byte, word, block, or the like. The programmable memory device thus produces a biasing addend signal x and a maximum address parameter signal R, both of which are delivered to the variable range adder 6. Signal R has a value equal to the maximum address plus one. The read or write signal r/w is delivered to the storage device 2. A delay 10 may be connected with the output of the programmable device 4 to delay the read or write signal r/w in accordance with the propagation delay of the VRA.

The VRA adds two integers from the range, zero through R-1. That sum is used to directly address a storage device. Any storage device may be used that has only one addressing port and only one port each for information input, output, or both. Examples of such devices are a RAM and a set of contiguously addressable but physically separate disk units, one unit per sensitivity.

The VRA accepts three nonnegative integer inputs: the subject's relative read or write address y; a biasing addend x; and R, one more than a read or write view's maximum address relative to $x=0$. The inputs y and r/w are supplied by software. R and x are provided by the programmable memory device 4. An inviolable source supplies the user's access privilege s which is converted into x and R instances by the programmable memory device as will be set forth below in connection with the example shown in FIGS. 3 and 4.

A secure write and read controller (SWRC) is realized by combinatorially connecting a programmable memory device with the components of the VRA, which will be discussed in greater detail in connection with FIG. 2. To protect a storage device, an SWRC must control the device's every physical write and read instance. Meeting this requirement is aided by the SWRC's intrinsic speed, possibly fast enough to fit within the clock cycle of many computers.

The legitimacy of an SWRC and "secure" relies on the inviolability of an authoritative source for s, a reliance common to all multilevel-secure computers. The inviolable source should be realized in hardware, unalterable by the computer's operating system except for information deletion. Correct-s assurance then becomes a probabilistic exercise: an optimally foolproof computer system is achieved when the probability of an incorrect s in the inviolable source is less than or equal to the probability of a compromising hardware failure. Given the described inviolable hardward source of probabilistically assured s, an SWRC is immune to all attempts, using software, to violate BL model writing and reading (again, corrupted subjects and electronic malfunctions aside, and within the abilities of the BL model).

Referring now to FIG. 2, the variable range adder 6 comprises an add device 12, a comparator 14, and an inclusive-OR logic device 16.

The add device 12 is connected with the input 8 and the programmable memory device 4 to receive as inputs the subject's read or write address y and the biasing addend x from software and the programmable memory device, respectively. The add device 12 adds the integers x and y to produce a sum signal $\Sigma$ which is delivered to the address input of the storage device 2. Any positive-or-negative sign inputs for x and y must be fixed at either positive or negative, and the positive-or-negative output sign for $\Sigma$ ignored.

The sum signal $\Sigma$ is also delivered as an input to the comparator 14. The other input to the comparator is the maximum address parameter signal R from the programmable memory device. The comparator compares the signals R and $\Sigma$, and produces an output signal $\geq R$ when $\Sigma$ is greater than or equal to R. Such a signal is delivered to the OR logic device 16 to disable the storage device. OR logic device 16 is a Boolean inclusive-OR on its three inputs, assuming an active input is valued greater than the inactive. OR is replaced by Boolean NAND if an active input is valued less than the inactive.

The storage device 2 is also disabled by the OR device 16 in response to overflow and borrow signals from the add device 12. An active overflow signal means that the adder's physical ability to represent $x+y$ over the nonnegative integers is exceeded while x and y are fixed at positive. An active borrow means that the adder's physical ability to represent $x+y$ over the nonpositive integers is exceeded while x and y are fixed at negative. While the borrow and overflow signals described herein represent a preferred embodiment, the function may be implemented by any other signals which indicate the the physical ability of adder 12 to represent $x+y$ has been exceeded.

A delay device 18 may be provided to delay delivery of the sum signal $\Sigma$ from the add device 12 to the storage device address, in accordance with the propagation delay of the comparator. As set forth above, input y is an integer address from the subject. It may include components installed outside the subject's control, say, by the host computer's operating system. The physical equivalent of addresses "seen" by the subject depend upon whether the intended access is read or write and the subject's access privilege.

R is one more than the maximum physical address, minus the "zero" physical address, of the current write or read view. During writing, R is also the count of storage device addresses allowed to the view.

During writing, $x=0$. During reading, $x=0$ if the subject has the greatest access privilege; x equals the least R used for writing if the subject's access privilege is next to the greatest; x equals the next to the least R used for writing if the subject's access privilege is two ranks away from the greatest, and so on; and x equals the next to the greatest R used for writing if the subject's access privilege is the least.

The apparatus of the invention will be more clearly understood by way of the following example.

Assume starting with a cleared storage device or one containing only nonsense. Let the storage device by a RAM having only 100 addressable words (locations). (A more realistic example in today's technology might use a RAM having 100K words, 100M words, or an arbitrary size sectioned into 100 segments of words. The number of "100" is also arbitrary).

Assume the set of sensitivity labels L=[U,C,S,T] where U<C<S<T and U=unclassified, C=confidential, S=secret, and T=top secret. These are the usual four U.S. Government sensitivities called "classifications". Then a subject's access privilege (or "clearance") s is one of U,C,S, or T, and an object's access requirement (or "classification") o is also one of U,C,S, or T.

Assign $x=0$ in preparation for writing memory and let the output of the VRA be in the range x through R-1. Let (conveniently) $R=5$ if the writer's privileges is $s=T$, $R=10$ if $s=S$, $R=50$ if $s=C$, and $R=100$ if $s=U$. Writing is to the address formed by $(x+y)<R$ with biasing addend $x=0$. So, when $s=T$ all information is stored in physical RAM locations 0 through 4, when $s=S$ all goes into 0 through 9, into 0 through 49 when $s=C$, and into 0 through 99 when $s=U$. These assignments also reflect a designer's decision to allot a maximum of 5 locations for the storage of T information, 10 for S information, 50 for C, and 100 for U. FIG. 3 depicts the resulting storage illustrating where the information is stored in the memory, and the resulting classifications of the objects o contained in the real view segments.

Fill the programmable memory device (e.g., PROM), unalterable after system startup, as shown in the following table, where read or write signal r/w∈[w,r], s∈L, R∈[100,50,10,5], and x∈[0,5,10,50].

| PROM address | addresses mean: | | PROM outputs | | |
|---|---|---|---|---|---|
| | r/w | s | r/w | R | S |
| 0 | w | U | w | 100 | 0 |
| 1 | w | C | w | 50 | 0 |
| 2 | w | S | w | 10 | 0 |
| 3 | w | T | w | 5 | 0 |
| 4 | r | U | r | 100 | 50 |
| 5 | r | C | r | 100 | 10 |
| 6 | r | S | r | 100 | 5 |
| 7 | r | T | r | 100 | 0 |

The PROM inputs and outputs may be in whatever encoded representation is convenient to the realization. Signal r/w instance encodings may pass unchanged from PROM input to output. Connecting the PROM's r/w output, as in FIG. 1, directly to the RAM's r/w input ensures that the r/w and s signals yield only the legitimate instances of r/w, R, and x stored in the PROM (which must be unalterable after system startup). Attempts to form a sum above R-1 are signalled by an active ≧R output (in FIG. 2), disabling the RAM to comply with the BL model.

FIG. 4 includes the resulting storage into write views, represented above the horizontal line by concatenated sensitivity labels. Notice that no T information can be found in locations 5 through 99, no S information in locations 10 through 99, and no C information in 50 through 99. This effectively requires o=T for locations 0 through 4, o=S for 5 through 9, o=C for 10 through 49, and o=U for 50 through 99, thereby forming the real view shown below the horizontal line in FIG. 4. The real view segments each define the objects, respectively containing information no greater than (or, whose access requirements are) U, C, S, or T. FIG. 4 also includes the resulting read views, represented above the horizontal line by concatenated lower-case versions of the sensitivity labels.

Reading is also from the address formed by (x+y)<R, but this time with R=100 and a biasing address x∈[0,5,10,50] corresponding one-to-one with [T,S,C,U].

The Method of the Invention

In accordance with the inventive method, the RAM (or any other qualified storage device) is partitioned into write, read, and real views. A view is defined here as the equivalent of a mathematical set. The RAM segment accessible to a writer under the current privilege is the write view; that to a reader is the read view. The read and write views are never identical given some s. The count of read and write views are always equal. Write views corresponding to different privileges overlap as do the read views. The real view identifies contiguous RAM segments, each assigned a unique sensitivity that is also the greatest sensitivity of the information stored there. A real view segment's sensitivity defines the sensitivity of the (BL model) objects contained therein.

Conceptually, a RAM is defined to be a nonempty set of memory locations totally ordered and identified by their addresses. Each write and read view is then a nonempty subset of the RAM, thereby requiring the count of RAM locations to be greater than or equal to the count of read or write views. One of the write and one of the read views are identically the RAM improper subset. Intersecting any pair of real view segments yields the null set. Intersecting all write views yields the write view for the greatest privilege, which is also the real view segment having the greatest access requirement. Intersecting all read views yields the read view for the least privilege, which is also the real view segment having the least access requirement.

Clear the RAM of sensitive information before its first use under the inventive method. Interpret into the three input parameters 8 the memory address selected by the subject, the subject's privilege, and whether the asserted access is read or write.

WRITING METHOD

The writing method is described with reference to FIG. 5, where |L| denotes the cardinality of set L and ∫ denotes set subtraction. Write views WV$_i$ are created of a total ordering a RAM addresses, where all WV$_i$ have a common least address and the union of all WV$_i$ is the improper subset, IS. Totally order the WV$_i$ with unique cardinalities and represent the greatest access privilege with the least carbinality, etc. Equate the current range (R) of x+y+1 to the current write view's cardinality, and fix VRA addend x at zero. The location written within a write view then depends only upon the subject's presented address.

The BL model write axiom requires that o≧s. Two implementations of this axiom would be either: first compare the access requirement with the access privilege to find whether or not o≧s exists; or write first, thereby defining the access requirement of that which is written to be greater than or equal to the access privilege. Although the first is normally used, the latter is preferred according to the inventive method. That is, the method assertively writes into a write view, thereby defining its (object) access requirement to be greater than or equal to the access privilege and unneccessitating comparisons of privilege with requirement before writing. Writing over the range of all access privileges identifies contiguous RAM segments (in aggregate, the real view) having unique access requirements. The smallest WV$_i$, representing the greatest (most sensitive) access requirement, is also the real view segment containing the least-ordered RAM address. The difference sets of WV$_i$ and WV$_{i+1}$ identify the remaining real view segments. These difference sets, as they form increasingly away from the smallest write view, represent the remaining access requirements in decreasingly-valued order.

READING METHOD

Figure 6:
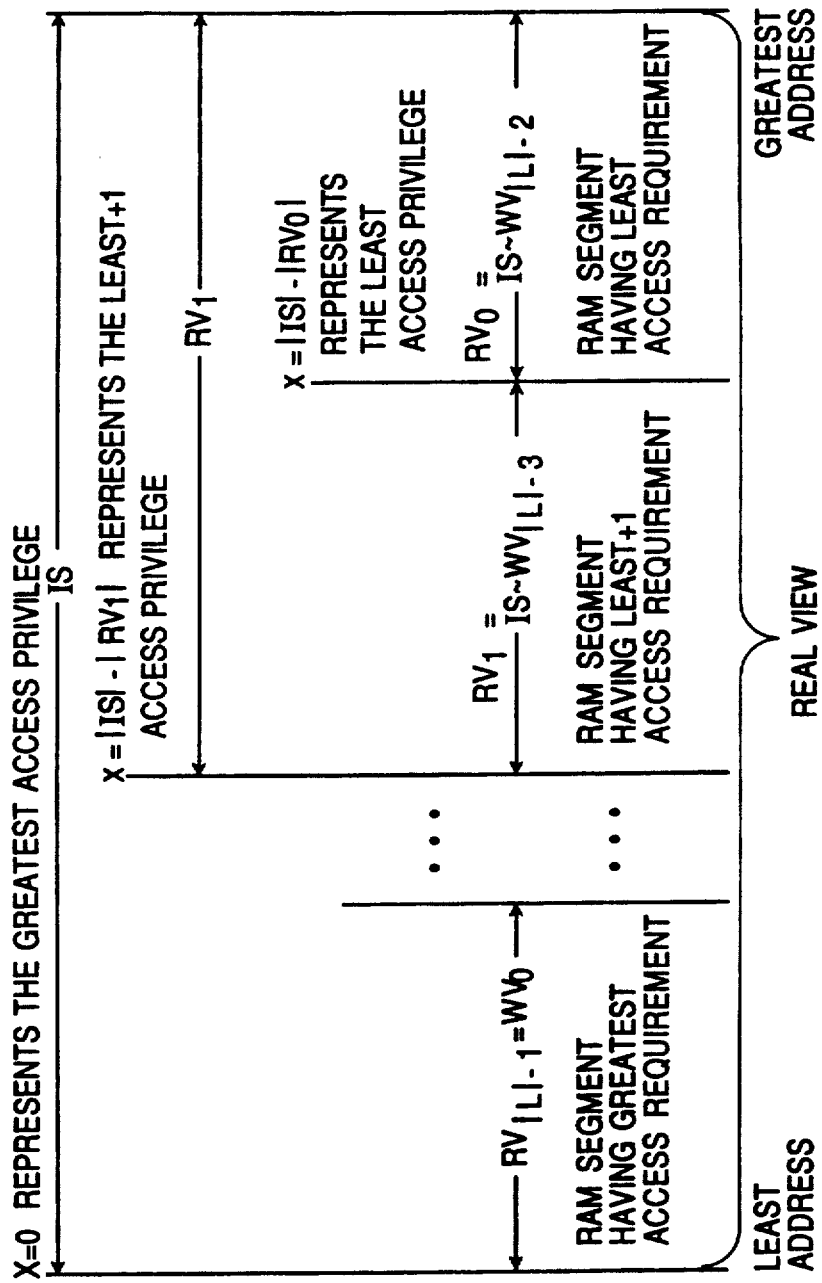
FIG. 6 illustrates the read and real views used to illustrate the method according to the invention.

The reading method is described with reference to FIG. 6.

Equate the VRA range input R during read to the RAM cardinality. Let VRA addend x vary over quantities that depend upon the current access privilege: zero, if the greatest privilege; the least range used for writing if next to the greatest privilege; the next higher range used for writing if two ranks away from the greatest privilege; etc. Each x instance and one less than the RAM cardinality defines the least and greatest address, respectively, of read views $RV_i$. Addend x totally orders the read views by their cardinaltiy.

The read views $RV_i$ are read by subjects having a privilege always greater than or equal to the access requirements defined during writing, rendering unneccessary the comparison of privilege with requirement before reading.

The location actually read then depends only upon the address presented by the subject, relative to addend x.

While in accordance with the provisions of the patent statute the preferred forms and embodiments have been illustrated and described, it will be apparent to those of ordinary skill in the art that various changes and modifications may be made without deviating from the inventive concepts set forth above.

What is claimed is:

1. Apparatus providing a subject with storage and retrieval of data in accordance with the Bell and La Padula security model, to and from a storage device having a single addressing port, such as a random access memory, wherein given a subject's access privilege s and an object's access requirement o, a subject may read an object only when $s \geq o$, a subject may write an object only when $o \geq s$, and a subject may neither read nor write an object when s and o are incomparable, comprising:
    (a) input means for providing input signals corresponding with the subject's relative read or write address (y), the subject's access privilege (s), and a read or write signal (r/w) from the subject;
    (b) programmable memory means connected with said input means for receiving the subject's access privilege signal (s) and the read or write signal (r/w), said programmable memory device converting the subject's access privilege signal into a biasing addend signal (x) and a maximum address parameter signal (R) in accordance with the subject's access privilege and delivering the read or write signal to the storage device; and
    (c) variable range adder means connected with said input means and with said programmable memory means for receiving the subject's read or write address signal (y), the biasing addend signal (x), and the maximum address parameter signal (R), said variable range adder means processing said received signals to address or disable the storage device in accordance with the arithmetic sum of the read or write address signal (y) and the biasing addend signal (x), and in accordance with a numerical comparison of said sum with the maximum address parameter signal (R), whereby when legitimate read or write address (y), access privilege (s), and read or write signals are presented, immediate read or write access is provided.

2. Apparatus as defined in claim 1, wherein said variable range adder means includes:
    (1) adder means connected with said input means and with said programmable memory means for receiving and adding arithmetically the read or write address signal (y) and the biasing addend signal (x) to produce a sum signal ($\Sigma$) for addressing the storage device, said adder means also producing first output signals when the adding ability of said adder means is exceeded;
    (2) compare means connected with said programmable memory device and with said adder means for receiving and comparing said maximum address parameter signal (R) and said sum signal ($\Sigma$), said compare means producing a second output signal ($\geq R$) when said sum signal is numerically greater than or equal to said maximum address parameter signal; and
    (3) means for disabling the storage device in response to said first and second output signals from said adder means and said compare means, respectively, whereby reading and writing of the storage device is prevented in response to inputs outside a predetermined range.

3. Apparatus as defined in claim 2, wherein said disabling means comprises an inclusive-OR logic device.

4. Apparatus as defined in claim 3, wherein said first output signals from said adder means comprise:
    (1) an overflow signal which is generated when the physical ability of said adder means to represent the sum of the read or write address signal (y) and the biasing addend signal (x) over the nonnegative integers is exceeded while the read or write address (y) and the biasing addend (x) are both positive; and
    (2) a borrow signal which is generated when the physical ability of said adder means to represent the sum of the read or write address signal (y) and the biasing addend signal (x) over the nonpositive integers is exceeded while the read or write address (6) and the biasing addend (x) are both negative.

5. Apparatus as defined in claim 4, and further comprising a delay device connected with the output of said adder means to delay said sum signal for addressing the storage device during operation of said compare means.

6. Apparatus as defined in claim 5, and further comprising a delay device connected with the output of said programmable memory device for delaying delivery of the read or write signal to the storage device.

7. A variable range adder enabling a subject to securely address a storage device having a single addressing port, such as a random access memory, comprising:
    (a) input means for providing inputs corresponding with the subject's relative read or write address (y), a biasing addend (x), and a maximum address parameter (R);
    (b) adder means connected with said input means for receiving and adding said read or write address (y) and biasing addend (x) inputs to produce a sum signal ($\Sigma$) for addressing the storage device, said adder means also producing first output signals when the adding ability of said adder means is exceeded;
    (c) compare means connected with said input means and with said adder means for receiving and comparing said maximum address parameter and said sum signals, said compare means producing a second output signal ($\geq R$) when said sum signal is greater than said maximum address parameter; and
    (d) means for disabling the storage device in response to said first output signals from said adder means and in response to said second output signal from said compare means, whereby reading and writing of the storage device is limited in response to inputs within a predetermined range.

8. Apparatus as defined in claim 7, wherein said disabling means comprises an inclusive-OR logic device.

9. Apparatus as defined in claim 8, wherein said first output signals from said adder means comprise:
    (1) an overflow signal which is generated when the physical ability of said adder means to represent the sum of said read or write address (y) and biasing addend (x) inputs over the nonnegative integers is exceeded while the read or write address (y) and the biasing addend (x) are both positive; and (2) a borrow signal which is generated when the physical ability of said adder means to represent the sum of said read or write address (y) and biasing addend (x) inputs over the nonpositive integers is exceeded while the read or write address (y) and the biasing addend (x) are both negative.

10. Apparatus as defined in claim 9, and further comprising a delay device connected with the output of said adder means to delay said sum signal for addressing the storage device during operation of said compare means.

* * * * *